No. 726,376. PATENTED APR. 28, 1903.
J. TOMPKINS.
WINDMILL.
APPLICATION FILED JULY 8, 1902.
NO MODEL. 2 SHEETS—SHEET 1.
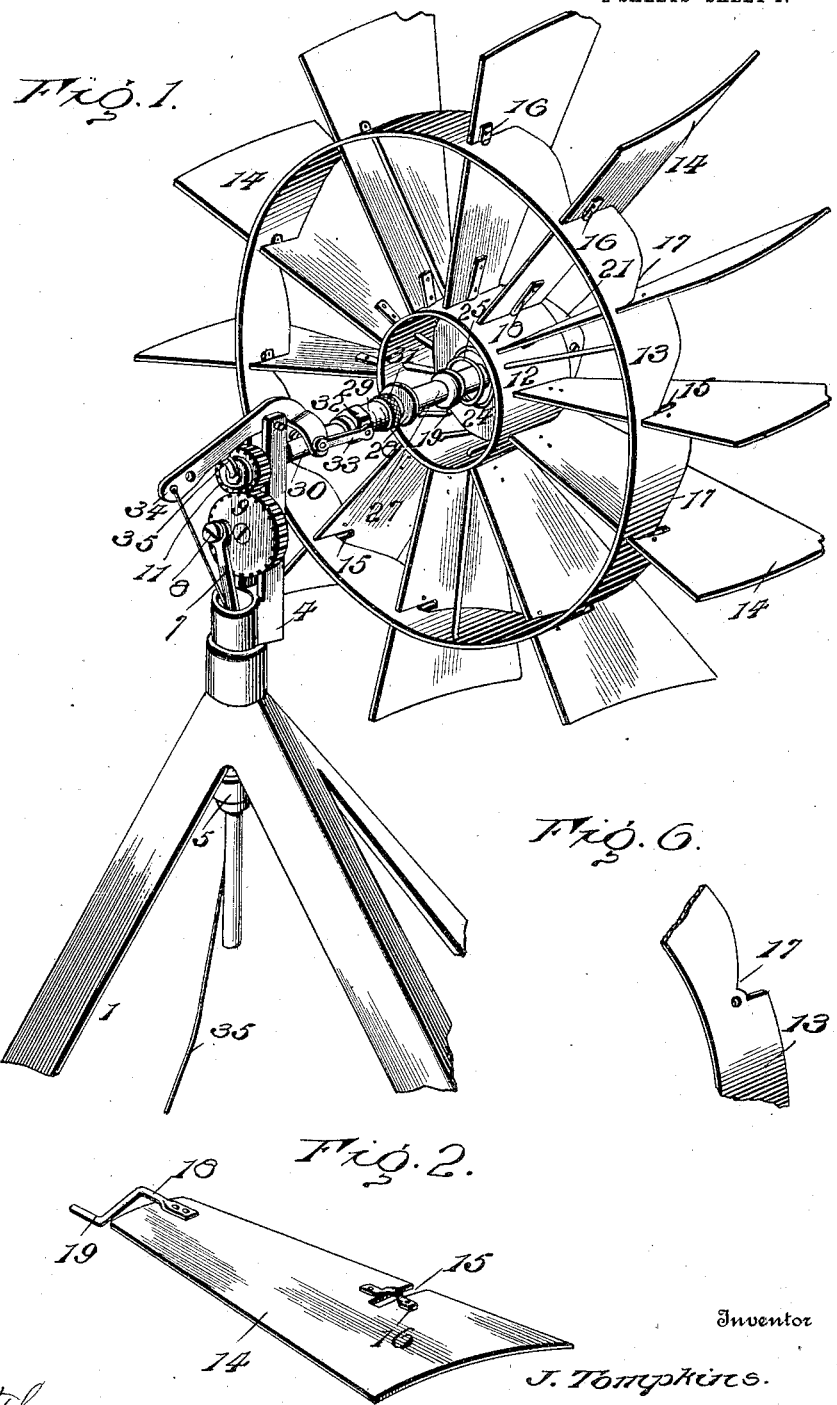
Witnesses
Gladys L. Thompson.
George G. Watt
Inventor
J. Tompkins.
By
R. S. & A. B. Lacey, Attorneys No. 726,376. PATENTED APR. 28, 1903.
J. TOMPKINS.
WINDMILL.
APPLICATION FILED JULY 8, 1902.
NO MODEL. 2 SHEETS—SHEET 2.
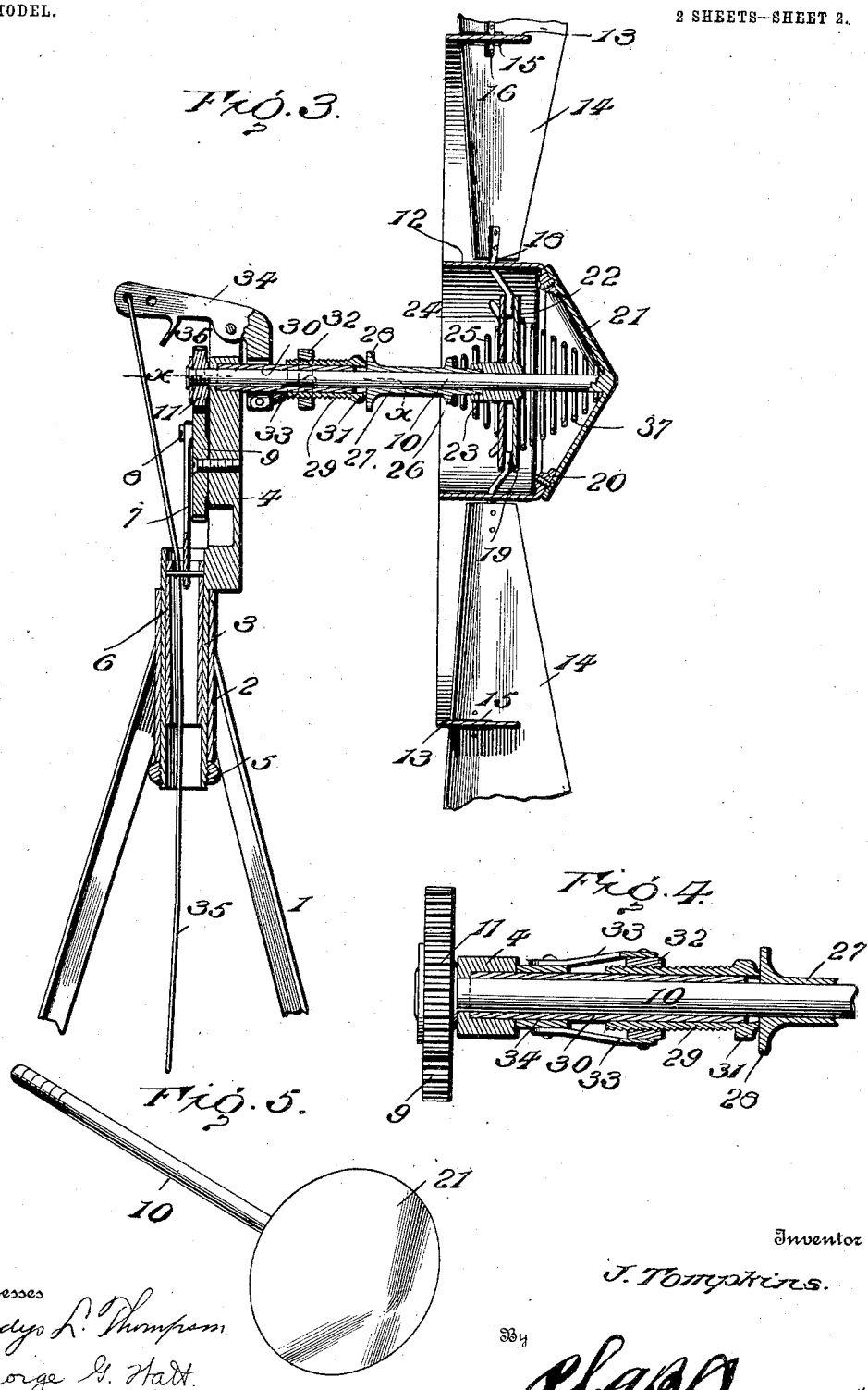
Witnesses
Gladys L. Thompson
George G. Halt
Inventor
J. Tompkins.
By
Lacey Attorneys

UNITED STATES PATENT OFFICE.

JESSE TOMPKINS, OF GATESVILLE, TEXAS, ASSIGNOR OF ONE-HALF TO A. MATHEWS AND G. W. ROYALTY, OF GATESVILLE, TEXAS.

WINDMILL.

SPECIFICATION forming part of Letters Patent No. 726,376, dated April 28, 1903.

Application filed July 8, 1902. Serial No. 114,809. (No model.)

*To all whom it may concern:*

Be it known that I, JESSE TOMPKINS, a citizen of the United States, residing at Gatesville, in the county of Coryell and State of Texas, have invented certain new and useful Improvements in Windmills, of which the following is a specification.

This invention belongs to the variety of engines operated by currents of air, the purpose being to dispense with the accustomed tail-vane and to mount the wings or blades in such a manner as to be controlled by the force of the wind and a compensating spring, the latter being set to hold the wings in the wind when the same is blowing at the usual force, said spring yielding when the wind attains a high rate of speed or velocity, so as to permit the wings to be thrown out of the wind to a greater or less extent, thereby obviating injury to the engine.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a windmill embodying the invention. Fig. 2 is a perspective view of a wing or blade. Fig. 3 is a vertical central section. Fig. 4 is a plan section on the line X X of Fig. 3, showing the parts on a larger scale. Fig. 5 is a perspective view of the shaft. Fig. 6 is a detail perspective view of a portion of the outer ring of the windmill, showing more clearly the formation of the notch.

Corresponding and like parts are referred to in the following description and indicated in all the views of the drawings by the same reference characters.

The tower or derrick 1 may be of any construction and is provided at its upper end with a vertical sleeve, bearing, or tube 2 for reception of the tubular portion 3 of the jack 4. The lower portion of the bearing 3 projects beyond the sleeve 2 and is externally threaded to receive a nut or collar 5, by means of which vertical displacement of the jack 4 is prevented. A barrel 6 is mounted to reciprocate vertically within the bearing 3 and is connected by a pitman 7 with the wrist-pin 8 of a power-driven wheel 9, receiving its motion from the shaft 10 of the engine by means of a pinion 11, secured to the inner end of the shaft 10 and in mesh with teeth of the wheel 9. The barrel 6 is adapted to be connected with the usual pump-rod in any convenient way.

The shaft 10 is journaled to the jack 4 and is provided at its outer end with the wind-wheel, comprising an inner ring 12, an outer ring 13, and wings or blades 14, pivoted to the rings 12 and 13, so as to admit of their turning under the action of the wind and governing-spring. The wings or blades 14 taper longitudinally and are slightly curved transversely, and each is provided in its rear edge with a slot 15 to receive the ring 13, the inner end portion of the slot being spanned by an arch 16, which obtains a bearing in the ring 13 at one side of the notch or cut-away portion 17 formed therein. The notch or cut-away portion 17 is approximately of V form, one edge being straight and the opposite edge curved, the straight edge of the notch limiting the movement of the wing or blade presenting the edge to the wind and the curved edge limiting the movement of the wing when in the wind. The arch 16 is a short length of stout wire or rod-iron and spans the slot 15, and it is secured to the wing in any substantial way and serves to pivotally connect the outer end of the wing with the ring 13. A bearing 18 is provided at the inner end of each wing and terminates in a crank 19, which extends into the ring 12, the bearing 18 being mounted or journaled in the said ring 12. The parts 18 and 19 are formed of a length of stout wire or rod-iron, which is secured to the wing in any substantial manner. The bearing elements 16 and 18 are in line and are near one edge of the respective wings, whereby the latter present a greater wind-surface upon one side of its axis than upon the other for the action of the wind to throw the wings out of the wind more or less, according to the velocity or force of the wind, thereby obviating injury to the engine when a high wind is raging or a gale blowing. The outer portion of the ring 12 is inturned, as shown at 20, and is secured to the overlapping edge of a conical cap 21 at the outer end of the shaft 10.

A plate or disk 22 is loosely mounted upon the shaft 10 and is provided with a hub 23, upon which a second plate or disk 24 is loosely mounted, the crank-arms 19 being confined between the two plates or disks 22 and 24. A spring 25 exerts a pressure against the plate 24, so as to confine the crank-arms 19 and prevent any lost motion or play between them and the plates, said spring being of conical form and confined between the plate 24 and a shoulder 26. A sleeve 27 is loosely mounted upon the shaft 10 and is connected by screw-threads with the hub 23 and is provided at one end with the shoulder 26 and at its opposite end with a corresponding shoulder 28. A push-piece or actuator 29 is loosely mounted upon the tubular bearing 30, projected laterally from the jack 4, and is adapted to come in contact with the adjacent end of the sleeve 27, so as to move it and the plates 22 and 24, so as to throw the engine out of the wind when required. This push-piece or actuator 29 consists of a sleeve externally threaded and having a milled portion 31 to be grasped for turning the sleeve when it is required to change its relation to the nut or collar 32, threaded upon said sleeve and connected by links 33 with the vertical members of the elbow-lever 34, pivoted to the upper end of the jack 4, the lower end of the vertical member being bifurcated, so as to embrace opposite sides of the bearing 30. A wire 35 is attached at its upper end to the horizontal member of the elbow-lever 34 and passes through the barrel 6 and extends within convenient reach, so as to be pulled upon to throw the windmill out of action when desired. A brake member 36 forms a part of or is attached to the horizontal member of the elbow-lever 34 and is adapted to engage frictionally with the end of the shaft 10 and the outer side of the pinion 11, so as to prevent any movement of the wheel when thrown out of the wind by a down pull upon the wire or connection 35.

A spring 37 exerts a pressure against the plate or disk 22, so as to hold the wings or blades 14 to the wind, and is confined between the cap-plate 21 and the plate 22. The cap-plate 21 and ring 12 form a housing which incases the springs 37 and 25 and the plates 22 and 24 and the cranks 19, so as to protect them from the elements, dust, and foreign matter. The crank-arms 19 are confined between parts which are adapted to yield in opposite directions. Hence any strain coming upon the wings or blades in one or the other direction will be compensated for by one or the other of the springs 37 and 25, thereby preventing undue strain from resulting injuriously to the operating parts of the engine.

The tension of the spring 37 is such as to hold the wings or blades of the wheel in the wind when not exceeding a dangerous velocity; but should the force of the wind approach a gale or exceed a given pressure or velocity the spring 37 will yield and admit of the wings or blades turning, so as to present a greater or less surface to the action of the wind, and when the force abates the wings are caused to assume a normal position by the spring 37 regaining itself, as will be readily appreciated.

Having thus described the invention, what is claimed as new is—

1. In a wind-engine, a wind-wheel having its wings pivoted, crank-arms extended from the wings, and means coöperating with said crank-arms to hold the wings in the wind under normal conditions, said means comprising separate elements between which the crank-arms are confined, said elements being yieldable in opposite directions, substantially as set forth.

2. In a wind-engine, a wind-wheel comprising pivoted wings, crank-arms extended from the wings, a plate having a hub, a second plate loosely mounted upon the hub of the first-mentioned plate, the crank-arms being confined between the two plates, and springs exerting an inward pressure against the two plates to confine the crank-arms therebetween, substantially as set forth.

3. In a wind-engine, a wind-wheel comprising pivoted wings, crank-arms connected with the wings, a plate, a spring exerting a pressure against said plate to hold the wings in the wind, a second plate for confining the crank-arms against the first-mentioned plate, a spring exerting a pressure against the second plate, and means controlled by hand for moving the two plates in unison against the tension of the first-mentioned spring for throwing the engine out of the wind, substantially as set forth.

4. In a wind-engine, the combination of a wind-wheel comprising pivoted wings, crank-arms connected with the wings, a connector for said crank-arms, a spring exerting a pressure against the connector for holding the wings in the wind, a sleeve coöperating with said connector, a lever adapted to be operated by hand for throwing the engine out of the wind, a brake thrown into action by means of said lever for preventing movement of the wind-wheel when the wings are thrown out of the wind, a collar connected for operation with said lever, and an actuator mounted upon the bearing of the wind-wheel shaft and having adjustable connection with said collar and adapted to coöperate with the aforementioned sleeve for throwing the engine out of the wind, substantially as set forth.

5. In a wind-engine, a wind-wheel comprising inner and outer rings, the outer ring having cut-away portions of approximately V form, one edge being straight and the other curved, wings having transverse slots in one edge near their outer ends, arch-pieces bridging said slots and obtaining bearings in the outer ring to one side of the straight edges of the respective V-shaped notches, bearings at the inner ends of the wings journaled in the inner ring and terminating in crank-arms, and means coöperating with said crank-arms to hold the wings in the wind and admit of the engine being thrown out of the wind at will, substantially as specified.

In testimony whereof I affix my signature in presence of two witnesses.

JESSE TOMPKINS. [L. S.]

Witnesses:
JOHN G. LONG,
H. S. CAMPTON.